(12) United States Patent
Feng

(10) Patent No.: US 10,873,420 B2
(45) Date of Patent: Dec. 22, 2020

(54) METHOD AND TERMINAL FOR DATA TRANSMISSION

(71) Applicant: GUANGDONG OPPO MOBILE TELECOMUNICATIONS CORP, LTD., Guangdong (CN)

(72) Inventor: Bin Feng, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 15/766,244

(22) PCT Filed: Dec. 18, 2015

(86) PCT No.: PCT/CN2015/097881
§ 371 (c)(1),
(2) Date: Apr. 5, 2018

(87) PCT Pub. No.: WO2017/101107
PCT Pub. Date: Jun. 22, 2017

(65) Prior Publication Data
US 2018/0287742 A1 Oct. 4, 2018

(51) Int. Cl.
*H04L 1/18* (2006.01)
*H04L 5/14* (2006.01)
(Continued)

(52) U.S. Cl.
CPC .......... *H04L 1/1812* (2013.01); *H04L 1/1854* (2013.01); *H04L 1/1887* (2013.01);
(Continued)

(58) Field of Classification Search
None
See application file for complete search history.

(56) References Cited

U.S. PATENT DOCUMENTS

2013/0322378 A1* 12/2013 Guan ................ H04W 72/1289
370/329
2014/0050186 A1* 2/2014 Kim ........................ H04L 5/001
370/329
(Continued)

FOREIGN PATENT DOCUMENTS

CN 102447538 A 5/2012
CN 102624507 A 8/2012
(Continued)

OTHER PUBLICATIONS

European Search Report in European application No. 15910578.2, dated Feb. 4, 2019.
(Continued)

*Primary Examiner* — Ayaz R Sheikh
*Assistant Examiner* — Faiyazkhan Ghafoerkhan
(74) *Attorney, Agent, or Firm* — Ladas & Parry, LLP

(57) ABSTRACT

Provided are a method and terminal for data transmission. According to the method, a terminal determines, according to configuration information sent by a base station, to use at least two different TTIs to transmit different PDSCHs and/or PUSCHs on a target carrier. The terminal detects whether first DCI is present in at least one PDCCH in a target subframe on the target carrier, the first DCI being used to schedule at least one PDSCH transmitted in the target subframe on the target carrier. When the terminal detects that the first DCI is not present, or that the first DCI is present and a TTI of the at least one PDSCH scheduled by the first DCI is smaller than the target subframe, the terminal detects dedicated DCI in a dedicated downlink control channel in a target subframe, a TTI of a PDSCH or PUSCH scheduled by the dedicated DCI being smaller than the target subframe.

20 Claims, 3 Drawing Sheets

(51) Int. Cl.
*H04W 72/04* (2009.01)
*H04L 5/00* (2006.01)

(52) U.S. Cl.
CPC .............. *H04L 5/0053* (2013.01); *H04L 5/14* (2013.01); *H04W 72/0446* (2013.01); *H04L 5/1469* (2013.01); *H04W 72/042* (2013.01)

(56) References Cited

U.S. PATENT DOCUMENTS

| | | | | |
|---|---|---|---|---|
| 2014/0161110 | A1* | 6/2014 | Kim | H04L 5/001 370/336 |
| 2014/0241318 | A1* | 8/2014 | Zhong | H04W 74/0833 370/331 |
| 2014/0293893 | A1* | 10/2014 | Papasakellariou | H04W 72/04 370/329 |
| 2016/0128028 | A1* | 5/2016 | Mallik | H04W 72/042 370/336 |
| 2016/0143030 | A1* | 5/2016 | Lee | H04W 56/0005 370/329 |
| 2016/0182213 | A1* | 6/2016 | Golitschek Edler von Elbwart | H04L 1/1854 370/294 |
| 2016/0192433 | A1* | 6/2016 | Deenoo | H04W 76/28 370/329 |
| 2016/0270116 | A1* | 9/2016 | Lin | H04W 72/1289 |
| 2017/0099127 | A1* | 4/2017 | Byun | H04L 5/0051 |
| 2017/0164363 | A1* | 6/2017 | Zhang | H04L 1/00 |
| 2017/0290008 | A1* | 10/2017 | Tooher | H04L 1/0007 |
| 2018/0020503 | A1* | 1/2018 | Deenoo | H04W 76/28 |
| 2018/0042013 | A1* | 2/2018 | Byun | H04J 11/00 |
| 2018/0049165 | A1* | 2/2018 | Byun | H04W 72/0446 |
| 2018/0110062 | A1* | 4/2018 | Byun | H04L 5/0053 |
| 2018/0123769 | A1* | 5/2018 | Pelletier | H04L 5/001 |
| 2018/0167967 | A1* | 6/2018 | Li | H04W 72/1268 |
| 2018/0175987 | A1* | 6/2018 | Shao | H04L 5/005 |
| 2018/0199322 | A1* | 7/2018 | Takeda | H04J 11/00 |
| 2018/0212732 | A1* | 7/2018 | You | H04L 5/0051 |
| 2018/0220419 | A1* | 8/2018 | Takeda | H04L 5/005 |
| 2018/0234998 | A1* | 8/2018 | You | H04W 72/042 |
| 2018/0249509 | A1* | 8/2018 | Yi | H04W 48/18 |
| 2018/0255550 | A1* | 9/2018 | Takeda | H04L 5/0094 |
| 2018/0310282 | A1* | 10/2018 | Shi | H04W 72/042 |
| 2018/0359745 | A1* | 12/2018 | Yeo | H04L 5/0055 |
| 2018/0376497 | A1* | 12/2018 | You | H04L 1/00 |

FOREIGN PATENT DOCUMENTS

| | | |
|---|---|---|
| CN | 104025496 A | 9/2014 |
| CN | 104468030 A | 3/2015 |
| CN | 104769877 A | 7/2015 |
| CN | 104468030 B | 6/2018 |
| EP | 2680651 A1 | 1/2014 |
| EP | 3179654 A1 | 6/2017 |
| EP | 3179654 A4 | 8/2017 |
| RU | 2443059 C2 | 2/2012 |
| RU | 2624639 C1 | 7/2017 |
| WO | 2008041804 A1 | 4/2008 |
| WO | 2015018084 A1 | 2/2015 |
| WO | 2015054275 A1 | 4/2015 |
| WO | 2015190663 A1 | 12/2015 |

OTHER PUBLICATIONS

English Translation of the Written Opinion of the International Search Authority in international application No. PCT/CN2015/097881, dated Sep. 23, 2016.
Interdigital Communications: "Support for Short TTIs and Processing Times in LTE", 3GPP Draft R1-157136 (Rel-13 Short TTIs), 3rd Generation Partnership Project (3GPP), Mobile Competence Centre; 650, Route Des Lucioles ; F-06921 Sophia-Antipolis Cedex; France, vol. RAN WG1, No. Anaheim, USA; Nov. 16, 2015-Nov. 20, 2015 Nov. 15, 2015 (Nov. 15, 2015), XP051003403, Retrieved from the Internet: URL: http://www.3gpp.org/ ftp/Meetings_3GPP_SYNC /RAN1/ Docs/ [retrieved on Nov. 15, 2015].
Huawei, HiSilicon; Control Signaling enhancements for short TTI; 3GPP TSG RAN WG1 Meeting #83, R1-156461; Nov. 22, 2015 URL:http://www.3gpp.org/ftp/tsg_ran/WG1_RL1/TSGR1_83/Docs/R1-156461.zip.
ZTE; L1 considerations on latency reduction; 3GPP TSG RAN WG1 Meeting #83, R1-157151; Nov. 22, 2015 URL:http://www.3gpp.org/ftp/tsg_ran/WG1_RL1/TSGR1_83/Docs/R1-157151.zip.
Samsung; Study on specification impact for downlink due to TTI shortening; 3GPP TSG RAN WG1 Meeing #83, R1-156819; Nov. 22, 2015 URL:http://www.3gpp.org/ftp/tsg_ran/WG1_RL1/TSGR1_83/Docs/R1-156819.zip.
First Office Action of the Japanese application No. 2018-509553, dated May 31, 2019.
Notice of Allowance of the Russian application No. 2018113772, dated May 29, 2019.
International Search Report in international application No. PCT/CN2015/097881, dated Sep. 23, 2016.
"On required physical layer enhancements for TTI shortening", 3GPP TSG-RAN WG1 Meeting #83 R1-157294 Anaheim, USA, Nov. 15-22, 2015.
"Discussion on TTI shortening ", 3GPP TSG RAN WG1 Meeting #83 R1-157110 Anaheim, USA, Nov. 16-20, 2015.
"Overview of Specification Impact for TTI Shortening", 3GPP TSG RAN WG1 Meeting #83 R1-156721 Anaheim, U.S., Nov. 15-22, 2014.
First Office Action of the Indian application No. 201817017133, dated Jun. 23, 2020.
CATT, System Analysis on TTI Shortening [online], 3GPP TSG-RAN WG1#83, 3GPP, Nov. 22, 2015, R1-156613, search date[Aug. 25, 2020], <URL:http://www.3gpp.org/ftp/tsg_ranNVG1_RLUTSGR1_83/Docs/R1-156613.zip>.
Samsung, Study on specification impact for uplink due to Tti shortening [online], 3GPP TSG-RAN WG1#83, 3GPP, Nov. 22, 2015, R1-156822, search date[Aug. 25, 2020], <URL:http://www.3gpp.orgiftp/tsg_ran/WG1_RL1/ TSGR1_83/Docs/R1-156822.zip>.
First Office Action of the Japanese application No. 2019-179418, dated Sep. 4, 2020.
First Office Action of the Brazilian application No. 1120180068250, dated Sep. 15, 2020.

* cited by examiner

US 10,873,420 B2

METHOD AND TERMINAL FOR DATA TRANSMISSION

RELATED APPLICATION

This application is an application under 35 U.S.C. 371 of International Application No. PCT/CN2015/097881 filed on Dec. 18, 2015, the entire contents of which are incorporated herein by reference.

TECHNICAL FIELD

The disclosure relates to the field of communications, and in particular to a method and terminal for data transmission.

BACKGROUND

In future communication technologies, delay reduction becomes one of key performance indicators as air-interface technologies and applications are extended continuously. For example, an end-to-end delay of real-time remote computing for mobile terminals is required to be smaller than 10 ms, a delay of traffic efficiency and safety is required to be 5 ms, and a Transmission Time Interval (TTI) of a Long Term Evolution (LTE) is 1 ms.

Because data processing and decoding delays are mainly associated with a TTI length, one of key technologies for reducing a transmission delay is to shorten a TTI. At present, an LTE-A Rel-13 has determined to start a research on shorter-TTI-based data transmission. A short TTI is advantageous to shorten the transmission delay at the cost of high signaling overhead and low spectral efficiency. For example, if a uniform TTI is determined for a terminal simultaneously having various services, according to services with a minimum delay requirement, resources will be wasted. In addition, the compatibility with an existing LTE system cannot be ensured over a carrier supporting short TTI transmission, that is, a TTI of 1 ms is not compatible.

SUMMARY

The disclosure provides a method and terminal for data transmission, capable of using various TTIs to transmit data on the same carrier.

According to a first aspect, a method for data transmission is provided. The method includes: a terminal determines, according to configuration information sent by a base station, to use at least two different TTIs to transmit different Physical Downlink Shared Channels (PDSCH) and/or different Physical Uplink Shared Channels (PUSCH) on a target carrier; the terminal detects, whether first Downlink Control Information (DCI) is present in a Physical Downlink Control Channel (PDCCH) in a target subframe on the target carrier, the first DCI being used to schedule a PDSCH transmitted in the target subframe on the target carrier; and when the terminal detects that the first DCI is not present in the PDCCH in the target subframe, or when the terminal detects that the first DCI is present in the PDCCH in the target subframe and a TTI of the PDSCH scheduled by the first DCI is smaller in length than the target subframe, the terminal detects a dedicated downlink control channel in a target downlink subframe, the dedicated control channel including dedicated DCI, a TTI of a PDSCH or PUSCH scheduled by the dedicated DCI being smaller in length than the target subframe.

Therefore, the method for data transmission in the embodiments of the disclosure allows the terminal to use at least two TTIs to transmit different PDSCHs and/or different PUSCHs on the same carrier. That is, the method may dynamically schedule the terminal to use different TTIs to transmit data, thereby increasing the utilization rate of resources.

In conjunction with the first aspect, in an implementation mode of the first aspect, the method may further include: when the terminal detects that the first DCI is present in the PDCCH in the target subframe and the TTI of the PDSCH scheduled by the first DCI is greater than or equal to the target subframe in length, the terminal receives the PDSCH scheduled by the first DCI.

In conjunction with the first aspect and the foregoing implementation modes, in another implementation mode of the first aspect, the terminal may further detect second DCI in the PDCCH in the target subframe on the target carrier, the second DCI being used to schedule the PUSCH.

In conjunction with the first aspect and the foregoing implementation modes, in another implementation mode of the first aspect, the target subframe is a downlink subframe or a special subframe in a Time Division Duplexing (TDD) system.

In conjunction with the first aspect and the foregoing implementation modes, in another implementation mode of the first aspect, the operation that the terminal detects whether first DCI is present in a PDCCH in a target subframe includes: the terminal detects whether the first DCI is present in a Common Search Space (CSS) of the PDCCH in the target subframe, the TTI of the PDSCH scheduled by the first DCI being equal in length to the target subframe, or equal in length to the longest TTI in at least two different TTIs, or equal in length to the shortest TTI in at least two different TTIs.

In conjunction with the first aspect and the foregoing implementation modes, in another implementation mode of the first aspect, the operation that the terminal detects whether first DCI is present in a PDCCH in a target subframe includes: the terminal detects whether the first DCI is present in a UE-specific Search Space (USS) of the PDCCH in the target subframe, the first DCI including a specific information field, the specific information field being used to indicate the length of the TTI of the PDSCH scheduled by the first DCI.

In conjunction with the first aspect and the foregoing implementation modes, in another implementation mode of the first aspect, when the terminal uses at least two different TTIs to transmit different PDSCHs, Hybrid Automatic Repeat reQuest (HARQ) process numbers of different PDSCHs are independently configured.

In conjunction with the first aspect and the foregoing implementation modes, in another implementation mode of the first aspect, the HARQ process number is indicated by an HARQ process number information field in the first DCI, the length of the HARQ process number information field being determined in one of the following manners: determining the length of the HARQ process number information field as 4 bits; determining a maximum number of HARQ processes supported currently and actually by the terminal according to the lengths of at least two different TTIs used currently by the terminal and a TDD uplink/downlink configuration used currently by the target carrier, and determining the length of the HARQ process number information field according to the maximum number of HARQ processes supported actually; determining the length of the HARQ process number information field according to a maximum number of HARQ processes supported by a TDD system, the TDD system supporting to use at least two different TTIs to transmit different PDSCHs and/or different PUSCHs on the same carrier; and determining the length of the HARQ process number information field according to a maximum number of HARQ processes supported by the terminal.

In conjunction with the first aspect and the foregoing implementation modes, in another implementation mode of the first aspect, transmission modes corresponding to different PDSCHs transmitted by at least two different TTIs are different; and/or, transmission modes corresponding to different PUSCHs transmitted by at least two different TTIs are different.

In conjunction with the first aspect and the foregoing implementation modes, in another implementation mode of the first aspect, when the first DCI is present in the USS and the TTI of the PDSCH scheduled by the first DCI is smaller in length than the target subframe, the format of the first DCI is 1A.

In conjunction with the first aspect and the foregoing implementation modes, in another implementation mode of the first aspect, the USS in the target subframe includes second DCI, the second DCI being used to schedule a PUSCH, a TTI of the PUSCH scheduled by the second DCI being smaller in length than the target subframe, and the format of the second DCI being 0.

In conjunction with the first aspect and the foregoing implementation modes, in another implementation mode of the first aspect, transmission modes corresponding to different PDSCHs transmitted by at least two different TTIs are identical; and/or, transmission modes corresponding to different PUSCHs transmitted by at least two different TTIs are identical. As such, it can be ensured that the count of blind detection for PDCCHs is not increased.

According to a second aspect, a terminal for data transmission is provided. The terminal is used to execute any of the methods in the foregoing first aspect or any possible implementation modes of the first aspect. Specifically, the terminal includes a unit for executing any of the methods in the foregoing first aspect or any possible implementation modes of the first aspect.

BRIEF DESCRIPTION OF DRAWINGS

In order to more clearly describe the technical solutions in the embodiments of the disclosure, drawings used in the embodiments of the disclosure will be simply introduced. Apparently, the drawings described below are merely some embodiments of the disclosure. On the premise of no creative work, those of ordinary skill in the art may also obtain other drawings according to these drawings.

DETAILED DESCRIPTION

The technical solutions in the embodiments of the disclosure will be clearly and completely described below with the drawings in the embodiments of the disclosure. Apparently, the described embodiments are part of the embodiments of the disclosure, not all of the embodiments. Based on the embodiments of the disclosure, all other embodiments obtained without creative work of those of ordinary skill in the art should fall within the scope of protection of the disclosure.

Figure 1:
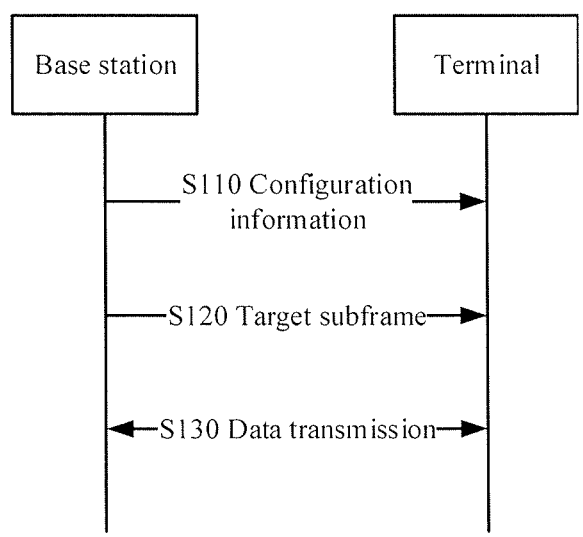
FIG. 1 is a schematic flowchart of a method for data transmission according to the embodiments of the disclosure.

FIG. 1 shows a schematic flowchart of a method 100 for data transmission according to the embodiments of the disclosure. The method 100 may be executed by a base station and a terminal. As shown in FIG. 1, the method 100 includes the operations as follows.

In S110, a base station sends configuration information to a terminal.

Specifically, the base station sends configuration information to the terminal. After the terminal receives the configuration information, it is determined, according to the configuration information, that the terminal may use at least two different TTIs to transmit different PDSCHs and/or different PUSCHs on a target carrier.

In S120, the terminal receives a target subframe sent by the base station on the target carrier, detects a PDCCH in the received target subframe, and may also detect a dedicated control channel in the target subframe, so as to determine the length of a TTI for data transmission on the target carrier. The target subframe may be a downlink subframe or a special subframe in a TDD system.

In the embodiments of the disclosure, TTIs with different lengths may be scheduled by different DCI. Different TTIs may be indicated by adding a TTI indicator field to DCI. Alternatively, a specific TTI used by the terminal may be dynamically indicated by using different scrambling sequences for a Cyclic Redundancy Check (CRC) of DCI or using different Radio Network Temporary Identities (RNTI) or using other manners. The embodiments of the disclosure are not limited thereto.

Specifically, the terminal detects whether first DCI is present in a PDCCH in a target subframe on the target carrier. The first DCI is used to schedule a PDSCH transmitted in the target subframe on the target carrier.

Alternatively, as an embodiment, when the terminal detects the first DCI in the PDCCH and a TTI of the PDSCH scheduled by the first DCI is greater than or equal to the target subframe in length, the terminal receives, according to the length of the TTI of the PDSCH scheduled by the first DCI, the PDSCH scheduled by the first DCI. Moreover, the terminal stops detecting a dedicated control channel in the target subframe, the dedicated control channel being used to transmit dedicated DCI, the dedicated DCI being used to schedule a PDSCH or PUSCH, and a TTI of the PDSCH or PUSCH scheduled by the dedicated DCI being smaller in length than the target subframe.

Alternatively, as an embodiment, when the terminal detects the first DCI in the PDCCH and a TTI of the PDSCH scheduled by the first DCI is smaller in length than the target subframe, the terminal receives, according to the length of the TTI of the PDSCH scheduled by the first DCI, the PDSCH scheduled by the first DCI. In addition, the terminal will continuously detect a dedicated control channel in the target subframe, the dedicated control channel being used to transmit dedicated DCI, the dedicated DCI being used to schedule a PDSCH or PUSCH, and a TTI of the PDSCH or PUSCH scheduled by the dedicated DCI being smaller in length than the target subframe. If the terminal detects the dedicated DCI, the terminal transmits, according to the length of the TTI of the PDSCH or PUSCH scheduled by the dedicated DCI, the PDSCH or PUSCH with the base station. If the terminal does not detect the dedicated DCI, the terminal may continuously detect a next subframe, and similarly, detect a PDCCH of the next subframe.

Alternatively, as an embodiment, when the terminal does not detect the first DCI in the PDCCH, the terminal may also continuously detect a dedicated control channel in the target subframe, the dedicated control channel being used to transmit dedicated DCI, the dedicated DCI being used to schedule a PDSCH or PUSCH, and a TTI of the PDSCH or PUSCH scheduled by the dedicated DCI being smaller in length than the target subframe. If the terminal detects the dedicated DCI, the terminal transmits, according to the length of the TTI of the PDSCH or PUSCH scheduled by the dedicated DCI, the PDSCH or PUSCH with the base station. If the terminal does not detect the dedicated DCI, the terminal may continuously detect a next subframe, and similarly, detect a PDCCH of the next subframe.

Further, the terminal detects, in the PDCCH, second DCI instead of the first DCI, the second DCI being used to schedule a PUSCH. The terminal sends, to the base station, the PUSCH scheduled by the second DCI.

In the embodiments of the disclosure, the first DCI or the second DCI may be located in a CSS in the PDCCH. Because the size of DCI in the CSS of the PDCCH cannot be randomly changed, that is, an indicator field of a TTI cannot be added, the DCI in the CSS cannot be used to indicate a specific length of the TTI, and the specific length can only be pre-set. For example, a PDSCH or PUSCH transmitted in the length of a conventional TTI scheduled to use by DCI in the CSS is pre-set, the conventional TTI being equal in length to a target subframe. Alternatively, a PDSCH or PUSCH transmitted in the length of a minimum or maximum TTI scheduled to use by DCI in the CSS is pre-set, the length of the minimum or maximum TTI referring to the length of a minimum or maximum TTI in at least two different TTIs supported by the terminal.

In the embodiments of the disclosure, the first DCI or the second DCI may also be located in a USS in the PDCCH. A TTI of a PDSCH or PUSCH, which can be scheduled by DCI in the USS, may be smaller in length than a target subframe, or may be equal in length to the target subframe, or may be greater in length than the target subframe, and the embodiments of the disclosure are not limited thereto. However, when TTIs with different lengths are scheduled, the sizes of DCI are identical. For example, when a PDSCH corresponding to a conventional TTI on a target carrier is scheduled by means of a DCI format 1A, the size of DCI is 29 bits, and when a PDSCH corresponding to a short TTI on a target carrier is scheduled by using a DCI format 1A, the size of DCI is still 29 bits. Here, the conventional TTI is equal in length to a target subframe, and the short TTI is smaller in length than the target subframe.

In the embodiments of the disclosure, a TTI of a PDSCH or PUSCH scheduled by dedicated DCI in a dedicated control channel is smaller in length than a target subframe. Because a dedicated downlink control channel is not used to schedule a PDSCH/PUSCH corresponding to a conventional TTI, that is, the TTI of the PDSCH or PUSCH scheduled by the dedicated DCI is smaller in length than the target subframe and is a short TTI, dedicated DCI may be designed based on demands of the short TTI, thereby reducing control signaling overheads. For example, when a DCI format 1A transmitted in a USS of a PDCCH is used to schedule a short TTI, the length of the DCI format 1A is 29 bits, but when a DCI format 1A transmitted in a dedicated downlink control channel schedules a short TTI, the DCI format 1A may be 20 bits or less. Alternatively, a new DCI format may be designed for a dedicated downlink control channel, and a short TTI is scheduled by means of the new DCI format. For example, the base station pre-configures partial bandwidths in system bandwidths to support short TTI transmission, so that a physical resource allocation indicator field in DCI may be set based on the configured partial bandwidths.

Figure 2:
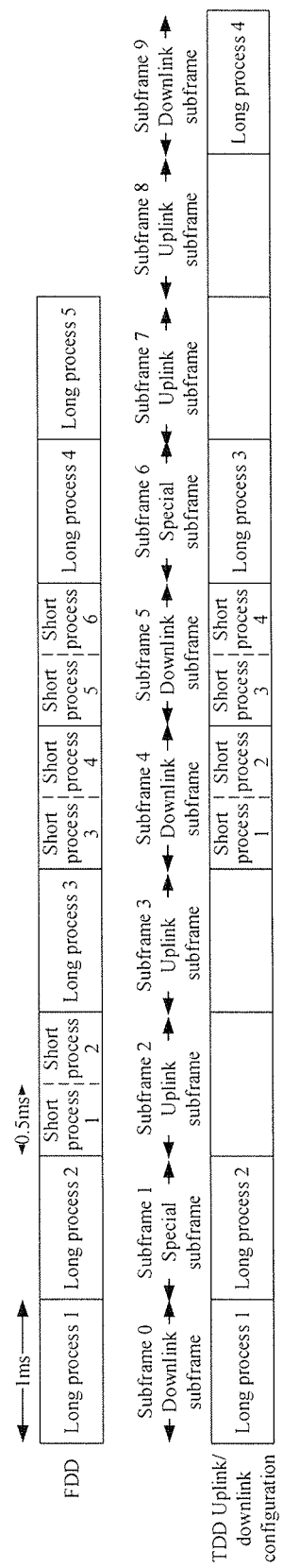
FIG. 2 is a schematic diagram of numbering HARQ processes according to the embodiments of the disclosure.

In the embodiments of the disclosure, because the terminal may use different TTIs to transmit different data, the maximum number of HARQ processes is probably changed. For example, the maximum number of HARQ processes for a Frequency Division Duplexing (FDD) system is still maintained to be 8. However, the maximum number of HARQ processes for a TDD system will be increased. For example, when a TTI is equal to 0.5 ms for a TDD uplink/downlink configuration 5, the maximum number of HARQ processes will reach 22. Therefore, when the terminal uses at least two different TTIs to transmit different PDSCHs, an HARQ process number may be configured independently. That is, an HARQ process may be numbered independently. For example, as shown in FIG. 2, a long-process TTI for an FDD system is 1 ms, a short-process TTI is 0.5 ms, and numbers of a long process and a short process are independent of each other. A TDD system is similar to the FDD system. A TDD uplink/downlink configuration 2 is taken for example herein. There are a long process and a short process over different subframes separately. Likewise, a long-process TTI may be 1 ms, a short-process TTI may be 0.5 ms, and numbers of the long process and the short process are independent of each other.

Specifically, the HARQ process number may be indicated by an HARQ process number information field in DCI, and the length of the HARQ process number information field may be determined in one of the following manners.

The length of the HARQ process number information field may be directly set as 4 bits. An HARQ process number is indicated by using 4 bits in DCI in a current TDD system. That is, 16 processes may be indicated maximally. A conventional 4-bit indication signaling may be followed. That is, it is limited that the number of HARQ processes in practical scheduling does not exceed 16 yet.

A maximum number of HARQ processes supported currently and actually by the terminal may also be determined according to the lengths of at least two different TTIs used currently by the terminal and a TDD uplink/downlink configuration used currently by the target carrier, and the length of a corresponding HARQ process number information field is determined according to the maximum number of HARQ processes supported actually. For example, a system supports two different TTIs to transmit different PDSCHs, namely 1 ms and 0.5 ms, and a current target carrier uses a TDD uplink/downlink configuration 5. In this case, a maximum number of the processes corresponding to a TTI of 1 ms is 15, and a maximum number of the processes corresponding to a TTI of 0.5 ms is 22. As such, the terminal determines that a maximum number of HARQ processes supported currently and actually by the terminal is 22, and the length of an HARQ process number information field used by the terminal is set as 5 bits.

The length of the HARQ process number information field may also be determined according to a maximum number of HARQ processes supported by a TDD system, the TDD system supporting to use at least two different TTIs to transmit different PDSCHs and/or different PUSCHs on the same carrier. For example, if the system may support 22 processes maximally, the length of an HARQ process number information field of a terminal using at least two different TTIs to transmit data may be set as 5 bits.

The length of the HARQ process number information field may also be determined according to a maximum number of HARQ processes supported by the terminal.

After the foregoing several methods are used, the lengths of HARQ process number information fields in DCI for scheduling different TTIs are identical.

In the embodiments of the disclosure, when the terminal uses different TTIs to transmit different PDSCHs and/or PUSCHs, identical transmission modes may be used, so that it can be ensured that the amount of PDCCHs for blind detection is not increased. Different transmission modes may also be used, and the embodiments of the disclosure are not limited thereto. However, when different transmission modes are used to schedule a short TTI in a PDCCH to transmit a PDSCH, the format of DCI adopts 1A (DCI format 1A). When different transmission modes are used to schedule a short TTI in a PDCCH to transmit a PUSCH, the format of DCI adopts 0 (DCI format 0), the short TTI here being representative of that the TTI is smaller in length than a target subframe.

In S130, data is transmitted between the base station and the terminal by using a determined TTI.

Specifically, after determining a TTI by detecting a PDCCH in a target subframe or a dedicated control channel, the terminal transmits a corresponding PDSCH or PUSCH according to the TTI, and so on, the terminal may detect a plurality of subframes on a target carrier. Herein, TTIs corresponding to PDSCHs or PUSCHs transmitted by each subframe may be different. Therefore, the terminal may use at least two different TTIs to transmit corresponding PDSCHs or PUSCHs in the target subframe.

Therefore, according to the method for data transmission in the embodiments of the disclosure, a terminal determines a TTI by detecting a PDCCH in a subframe on a carrier or a dedicated control channel. Herein, the TTI may be smaller than or equal to or greater than the target subframe in length. As such, the terminal may use at least two TTIs to transmit different PDSCHs and/or different PUSCHs on the same carrier, that is, the terminal may be dynamically scheduled to use different TTIs to transmit data, thereby avoiding resource waste.

In conjunction with FIG. 1 and FIG. 2, the method for data transmission according to the embodiments of the disclosure is described above. In conjunction with FIG. 3, a terminal for data transmission according to the embodiments of the disclosure will be described below.

Figure 3:
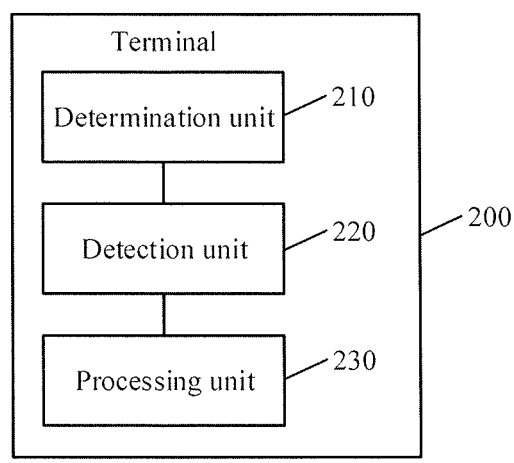
FIG. 3 is a schematic block diagram of a terminal for data transmission according to the embodiments of the disclosure.

As shown in FIG. 3, a terminal 200 for data transmission according to the embodiments of the disclosure includes:

a determination unit 210, configured to determine, according to configuration information sent by a base station, to use at least two different TTIs to transmit different PDSCHs and/or different PUSCHs on a target carrier;

a detection unit 220, configured to detect whether first DCI is present in a PDCCH in a target subframe on the target carrier, the first DCI being used to schedule a PDSCH transmitted in the target subframe on the target carrier; and a processing unit 230, configured to detect, when the terminal detects that the first DCI is not present in the PDCCH in the target subframe, or when the terminal detects that the first DCI is present in the PDCCH in the target subframe and a TTI of the PDSCH scheduled by the first DCI is smaller in length than the target subframe, a dedicated downlink control channel in a target downlink subframe, the dedicated control channel including dedicated DCI, a TTI of a PDSCH or PUSCH scheduled by the dedicated DCI being smaller in length than the target subframe.

Therefore, the terminal for data transmission in the embodiments of the disclosure determines a TTI by detecting a PDCCH in a subframe on a carrier or a dedicated control channel. Herein, the TTI may be smaller than or equal to or greater than the target subframe in length. Therefore, the terminal may use at least two TTIs to transmit different PDSCHs and/or different PUSCHs on the same carrier, that is, the terminal may be dynamically scheduled to use different TTIs to transmit data, thereby avoiding resource waste.

Alternatively, the processing unit is further configured to receive, when the terminal detects that the first DCI is present in the PDCCH in the target subframe and the TTI of the PDSCH scheduled by the first DCI is greater than or equal to the target subframe in length, the PDSCH scheduled by the first DCI.

Alternatively, the target subframe is a downlink subframe or a special subframe in a TDD system.

Alternatively, the detection unit is specifically configured to detect whether the first DCI is present in a CSS of the PDCCH in the target subframe, the TTI of the PDSCH scheduled by the first DCI being equal in length to the target subframe, or equal in length to the longest TTI in at least two different TTIs, or equal in length to the shortest TTI in at least two different TTIs.

Alternatively, the detection unit is specifically configured to detect whether the first DCI is present in a USS of the PDCCH in the target subframe, the first DCI including a specific information field, the specific information field being used to indicate the length of the TTI of the PDSCH scheduled by the first DCI.

Alternatively, when the terminal uses at least two different TTIs to transmit different PDSCHs, HARQ process numbers of different PDSCHs are independently configured.

Alternatively, the HARQ process number is indicated by an HARQ process number information field in the first DCI, and the length of the HARQ process number information field may be determined as 4 bits.

Alternatively, a maximum number of HARQ processes supported currently and actually by the terminal may also be determined according to the lengths of at least two different TTIs used currently by the terminal and a TDD uplink/downlink configuration used currently by the target carrier, and the length of the HARQ process number information field is determined according to the maximum number of HARQ processes supported actually.

Alternatively, the length of the HARQ process number information field may also be determined according to a maximum number of HARQ processes supported by a TDD system, the TDD system supporting to use at least two different TTIs to transmit different PDSCHs and/or different PUSCHs on the same carrier.

Alternatively, the length of the HARQ process number information field may also be determined according to a maximum number of HARQ processes supported by the terminal.

Alternatively, transmission modes corresponding to different PDSCHs transmitted by at least two different TTIs are different; and/or, transmission modes corresponding to different PUSCHs transmitted by at least two different TTIs are different.

Alternatively, when the first DCI is present in the USS and the TTI of the PDSCH scheduled by the first DCI is smaller in length than the target subframe, the format of the first DCI is 1A.

Alternatively, the USS in the target subframe includes second DCI, the second DCI being used to schedule a PUSCH, a TTI of the PUSCH scheduled by the second DCI being smaller in length than the target subframe, and the format of the second DCI being 0.

It will be appreciated that the terminal 200 for data transmission according to the embodiments of the disclosure may correspond to a terminal for executing the method 100 in the embodiments of the disclosure, and the foregoing and other operations and/or functions of respective units in the terminal 200 implement a flow corresponding to the terminal in the method in FIG. 1, which will not be elaborated herein for purpose of conciseness.

Therefore, the terminal for data transmission in the embodiments of the disclosure determines a TTI by detecting a PDCCH in a subframe on a carrier or a dedicated control channel. Herein, the TTI may be smaller than or equal to or greater than the target subframe in length. Therefore, the terminal may use at least two TTIs to transmit different PDSCHs and/or different PUSCHs on the same carrier, that is, the terminal may be dynamically scheduled to use different TTIs to transmit data, thereby avoiding resource waste.

Those of ordinary skill in the art may be aware of that units and algorithm steps of each example described in the embodiments disclosed herein can be implemented by electronic hardware or combination of computer software and electronic hardware. Whether these functions are executed in a hardware manner or a software manner depends on specific applications and design constraint conditions of the technical solutions. Professionals may use different methods to implement functions described by each specific application. However, this implementation should not be regarded to be beyond the scope of the disclosure.

Those skilled in the art may clearly know that specific working processes of systems, devices and units described above may refer to corresponding processes in the foregoing method embodiments for convenience and conciseness of description.

In several embodiments provided by the present application, it will be appreciated that the disclosed system, device and method may be implemented in other manners. For example, the device embodiment described above is merely schematic. For example, division of the units is merely logic function division, and other division manners may be adopted during practical implementation. For example, a plurality of units or components may be combined or integrated into another system, or some characteristics may be neglected or not executed. In addition, coupling or direct coupling or communication connection between the displayed or discussed components may be indirect coupling or communication connection, implemented through some interfaces, of the devices or the units, and may be electrical and mechanical or adopt other forms.

The units described as separate parts may or may not be physically separated, and parts displayed as units may or may not be physical units, namely may be located in the same place or may also be distributed to a plurality of network units. Part or all of the units may be selected to achieve the purpose of the solutions of the present embodiment according to a practical requirement.

In addition, each function unit in each embodiment of the disclosure may be integrated into a processing unit, each unit may also be present independently, and two or more than two units may also be integrated into a unit.

If being implemented in a form of software function unit and sold or used as an independent product, the function may be stored in a computer-readable storage medium. Based on such understanding, the essence of the technical solutions of the disclosure or parts contributing to the related art or parts of the technical solutions may be embodied in a form of software product, and the computer software product is stored in a storage medium, including a plurality of instructions enabling computer equipment (personal computer, server or network equipment) to execute all or some of the steps of the method according to each embodiment of the disclosure. The foregoing storage medium includes: various media capable of storing program codes such as a U disk, a mobile hard disk, a Read-Only Memory (ROM), a Random Access Memory (RAM), a magnetic disk or an optical disk.

The above is only the detailed description of the disclosure. However, the scope of protection of the disclosure is not limited thereto. As will occur to those skilled in the art, the disclosure is susceptible to changes or replacements within the technical scope disclosed by the disclosure, and these changes or replacements should fall within the scope of protection of the disclosure. Therefore, the scope of protection of the disclosure should be determined by the scope of protection of the claims.

The invention claimed is:

1. A method for data transmission, comprising:
   determining, by a terminal, according to configuration information sent by a base station, to use at least two different Transmission Time Intervals (TTIs) to transmit different Physical Downlink Shared Channels (PDSCHs) and/or different Physical Uplink Shared Channels (PUSCHs) on a target carrier;
   detecting, by the terminal, whether first Downlink Control Information (DCI) is present in at least one Physical Downlink Control Channel (PDCCH) in a target subframe on the target carrier, the first DCI being used to schedule at least one PDSCH transmitted in the target subframe on the target carrier; and
   in the case that the terminal detects that the first DCI is not present in the at least one PDCCH in the target subframe, or in the case that the terminal detects that the first DCI is present in the at least one PDCCH in the target subframe and a TTI of the at least one PDSCH scheduled by the first DCI is smaller in length than the target subframe, detecting, by the terminal, a dedicated downlink control channel in the target subframe, the dedicated control channel merely being used to transmit dedicated DCI, a TTI of a PDSCH or PUSCH scheduled by the dedicated DCI being smaller in length than the target subframe.

2. The method according to claim 1, further comprising:
   in the case that the terminal detects that the first DCI is present in the at least one PDCCH in the target subframe and the TTI of the at least one PDSCH scheduled by the first DCI is greater than or equal to the target subframe in length, the terminal receives the at least one PDSCH scheduled by the first DCI.

3. The method according to claim 1, wherein the target subframe is a downlink subframe or a special subframe in a Time Division Duplexing (TDD) system.

4. The method according to claim 2, wherein detecting, by the terminal, whether the first DCI is present in the at least one PDCCH in the target subframe comprises:
   detecting, by the terminal, whether the first DCI is present in a Common Search Space (CSS) of the at least one PDCCH in the target subframe, the TTI of the at least one PDSCH scheduled by the first DCI being equal in length to the target subframe, or equal to the longest TTI in the at least two different TTIs, or equal to the shortest TTI in the at least two different TTIs.

5. The method according to claim 2, wherein detecting, by the terminal, whether the first DCI is present in the at least one PDCCH in the target subframe comprises:

detecting, by the terminal, whether the first DCI is present in a UE-specific Search Space (USS) of the at least one PDCCH in the target subframe, the first DCI comprising a specific information field, the specific information field being used to indicate the TTI of the at least one PDSCH scheduled by the first DCI.

6. The method according to claim 1, wherein
when the terminal uses the at least two different TTIs to transmit the different PDSCHs, Hybrid Automatic Repeat reQuest (HARQ) process numbers of the different PDSCHs are independently configured.

7. The method according to claim 6, wherein a HARQ process number is indicated by an HARQ process number information field in the first DCI, a length of the HARQ process number information field being determined in one of the following manners:
    determining the length of the HARQ process number information field as 4 bits;
    determining a maximum number of HARQ processes supported actually by the terminal according to the lengths of the at least two different TTIs used currently by the terminal and a TDD uplink/downlink configuration used currently by the target carrier, and determining the length of the HARQ process number information field according to the maximum number of HARQ processes supported actually;
    determining the length of the HARQ process number information field according to a maximum number of HARQ processes supported by a TDD system, the TDD system supporting to use at least two different TTIs to transmit different PDSCHs and/or different PUSCHs on the same carrier; and
    determining the length of the HARQ process number information field according to a maximum number of HARQ processes supported by the terminal.

8. The method according to claim 1, wherein
transmission modes corresponding to the different PDSCHs transmitted by the at least two different TTIs are different; and/or,
transmission modes corresponding to the different PUSCHs transmitted by the at least two different TTIs are different.

9. The method according to claim 1, wherein
in the case that the first DCI is present in a USS and the TTI of the at least one PDSCH scheduled by the first DCI is smaller in length than the target subframe, the format of the first DCI is 1A.

10. The method according to claim 1, wherein a USS in the target subframe comprises second DCI, the second DCI being used to schedule a PUSCH, a TTI of the PUSCH scheduled by the second DCI being smaller in length than the target subframe, and the format of the second DCI being 0.

11. A terminal for data transmission, comprising a processor; and a memory for storing instructions executable by the processor, wherein execution of the instructions by the processor causes the processor to perform:
    determining, according to configuration information sent by a base station, to use at least two different Transmission Time Intervals (TTIs) to transmit different Physical Downlink Shared Channels (PDSCHs) and/or different Physical Uplink Shared Channels (PUSCHs) on a target carrier;
    detecting whether first Downlink Control Information (DCI) is present in at least one Physical Downlink Control Channel (PDCCH) in a target subframe on the target carrier, the first DCI being used to schedule at least one PDSCH transmitted in the target subframe on the target carrier; and
    detecting, in the case that the terminal detects that the first DCI is not present in the at least one PDCCH in the target subframe, or in the case that the terminal detects that the first DCI is present in the at least one PDCCH in the target subframe and a TTI of the at least one PDSCH scheduled by the first DCI is smaller in length than the target subframe, a dedicated downlink control channel in the target subframe, the dedicated control channel merely being used to transmit dedicated DCI, a TTI of a PDSCH or PUSCH scheduled by the dedicated DCI being smaller in length than the target subframe.

12. The terminal according to claim 11, wherein the execution of the instructions by the processor causes the processor to further perform:
    receiving, in the case that the terminal detects that the first DCI is present in the at least one PDCCH in the target subframe and the TTI of the at least one PDSCH scheduled by the first DCI is greater than or equal to the target subframe in length, the at least one PDSCH scheduled by the first DCI.

13. The terminal according to claim 11, wherein the target subframe is a downlink subframe or a special subframe in a Time Division Duplexing (TDD) system.

14. The terminal according to claim 12, wherein detecting whether the first DCI is present in the at least one PDCCH in the target subframe comprises:
    detecting whether the first DCI is present in a Common Search Space (CSS) of the at least one PDCCH in the target subframe, the TTI of the at least one PDSCH scheduled by the first DCI being equal in length to the target subframe, or equal to the longest TTI in the at least two different TTIs, or equal to the shortest TTI in the at least two different TTIs.

15. The terminal according to claim 12, wherein detecting whether the first DCI is present in the at least one PDCCH in the target subframe comprises:
    detecting whether the first DCI is present in a UE-specific Search Space (USS) of the at least one PDCCH in the target subframe, the first DCI comprising a specific information field, the specific information field being used to indicate the TTI of the at least one PDSCH scheduled by the first DCI.

16. The terminal according to claim 11, wherein
when the terminal uses the at least two different TTIs to transmit the different PDSCHs, Hybrid Automatic Repeat reQuest (HARQ) process numbers of the different PDSCHs are independently configured.

17. The terminal according to claim 16, wherein a HARQ process number is indicated by an HARQ process number information field in the first DCI, a length of the HARQ process number information field being determined in one of the following manners:
    determining the length of the HARQ process number information field as 4 bits;
    determining a maximum number of HARQ processes supported actually by the terminal according to the lengths of the at least two different TTIs used currently by the terminal and a TDD uplink/downlink configuration used currently by the target carrier, and determining the length of the HARQ process number information field according to the maximum number of HARQ processes supported actually;

determining the length of the HARQ process number information field according to a maximum number of HARQ processes supported by a TDD system, the TDD system supporting to use at least two different TTIs to transmit different PDSCHs and/or different PUSCHs on the same carrier; and determining the length of the HARQ process number information field according to a maximum number of HARQ processes supported by the terminal.

18. The terminal according to claim 11, wherein transmission modes corresponding to the different PDSCHs transmitted by the at least two different TTIs are different; and/or, transmission modes corresponding to the different PUSCHs transmitted by the at least two different TTIs are different.

19. The terminal according to claim 11, wherein in the case that the first DCI is present in a USS and the TTI of the at least one PDSCH scheduled by the first DCI is smaller in length than the target subframe, the format of the first DCI is 1A.

20. The terminal according to claim 11, wherein a USS in the target subframe comprises second DCI, the second DCI being used to schedule a PUSCH, a TTI of the PUSCH scheduled by the second DCI being smaller in length than the target subframe, and the format of the second DCI being 0.

* * * * *